United States Patent
Nagashima et al.

(10) Patent No.: US 9,028,150 B2
(45) Date of Patent: May 12, 2015

(54) THRUST SLIDING BEARING AND COMBINATION MECHANISM OF THE THRUST SLIDING BEARING AND A PISTON ROD

(75) Inventors: Tsuyoshi Nagashima, Kanagawa (JP); Takashi Horiguchi, Kanagawa (JP); Kouichi Morishige, Kanagawa (JP)

(73) Assignee: Oiles Corporation, Tokyo (JP)

( * ) Notice: Subject to any disclaimer, the term of this patent is extended or adjusted under 35 U.S.C. 154(b) by 0 days.

(21) Appl. No.: 14/008,971

(22) PCT Filed: Jan. 25, 2012

(86) PCT No.: PCT/JP2012/000477
§ 371 (c)(1),
(2), (4) Date: Sep. 30, 2013

(87) PCT Pub. No.: WO2012/132176
PCT Pub. Date: Oct. 4, 2012

(65) Prior Publication Data
US 2014/0185971 A1    Jul. 3, 2014

(30) Foreign Application Priority Data
Mar. 30, 2011    (JP) .................. 2011-076387

(51) Int. Cl.
*F16C 17/04* (2006.01)
*B60G 15/00* (2006.01)
(Continued)

(52) U.S. Cl.
CPC ................ *F16C 41/00* (2013.01); *F16C 17/04* (2013.01); *F16C 33/1065* (2013.01);
(Continued)

(58) Field of Classification Search
CPC ........ F16C 17/04; F16C 17/045; F16C 17/10; F16C 33/1065; F16C 33/20; F16C 2326/05; B60G 15/068; B60G 2204/418
USPC ................... 384/420, 422, 425; 280/124.146, 280/124.147, 124.155
See application file for complete search history.

(56) References Cited

U.S. PATENT DOCUMENTS 8,256,965 B2 * 9/2012 Kaneko et al. ................ 384/420
8,596,661 B2 * 12/2013 Kaneko et al. ......... 280/124.155
2008/0310780 A1   12/2008 Watai et al.

FOREIGN PATENT DOCUMENTS

EP    2 258 962    12/2010
JP    8-2500    1/1996
(Continued)

OTHER PUBLICATIONS

International Search Report for PCT/JP2012/000477, mailed Feb. 21, 2012.
Extended European Search Report issued in European Application No. 12764735.2, dated Sep. 9, 2014.

*Primary Examiner* — James Pilkington
(74) *Attorney, Agent, or Firm* — Nixon & Vanderhye P.C.

(57) ABSTRACT

A thrust sliding bearing includes a synthetic resin-made bearing body having a hollow cylindrical portion, an annular collar portion, an annular protruding portion, a tubular projecting portion, an engaging projecting portion, and an annular projecting portion; an annular cover having a disk portion, a tubular portion, and an engaging projecting portion; an annular metal plate having an outer disk portion and an inner disk portion; and a thrust sliding bearing which is interposed between the bearing body and an annular lower surface of the outer disk portion of the annular metal plate and renders the annular metal plate rotatable with respect to the bearing body in a direction about an axis of the bearing body.

14 Claims, 10 Drawing Sheets

(51) Int. Cl.
  *F16C 41/00* (2006.01)
  *F16C 33/10* (2006.01)
  *F16C 33/20* (2006.01)
  *B60G 15/06* (2006.01)
  *F16C 17/10* (2006.01)
(52) U.S. Cl.
  CPC ........... *F16C 33/208* (2013.01); *B60G 15/068* (2013.01); *B60G 2204/418* (2013.01); *F16C 17/045* (2013.01); *F16C 33/20* (2013.01); *F16C 17/10* (2013.01); *F16C 2326/05* (2013.01)

(56) References Cited

FOREIGN PATENT DOCUMENTS

| | | |
|---|---|---|
| JP | 08-326758 | 12/1996 |
| JP | 2001-027227 | 1/2001 |
| JP | 2003-269458 | 9/2003 |
| JP | 2004-225754 | 8/2004 |
| JP | 2004-263773 | 9/2004 |
| JP | 2008-025746 | 2/2008 |
| JP | 2008-202703 | 9/2008 |

\* cited by examiner

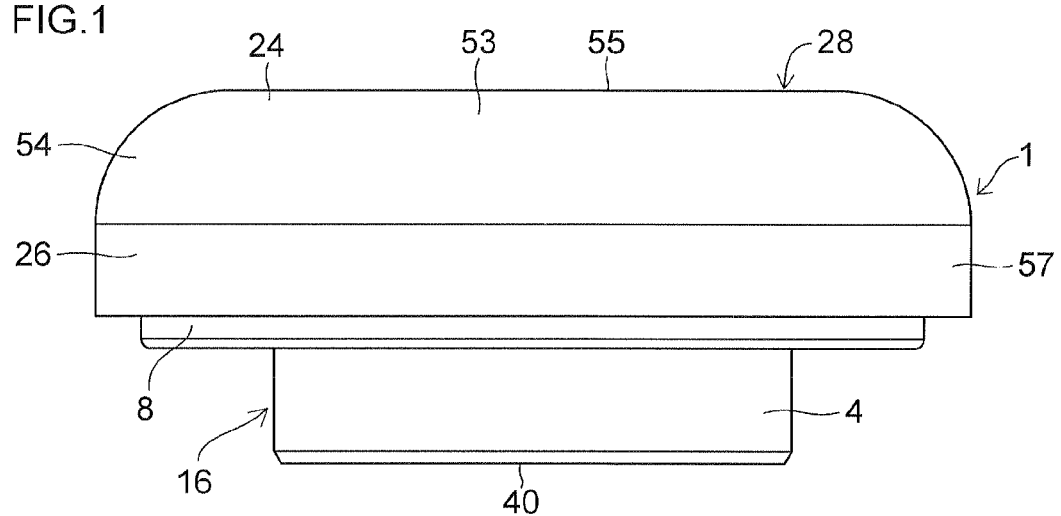
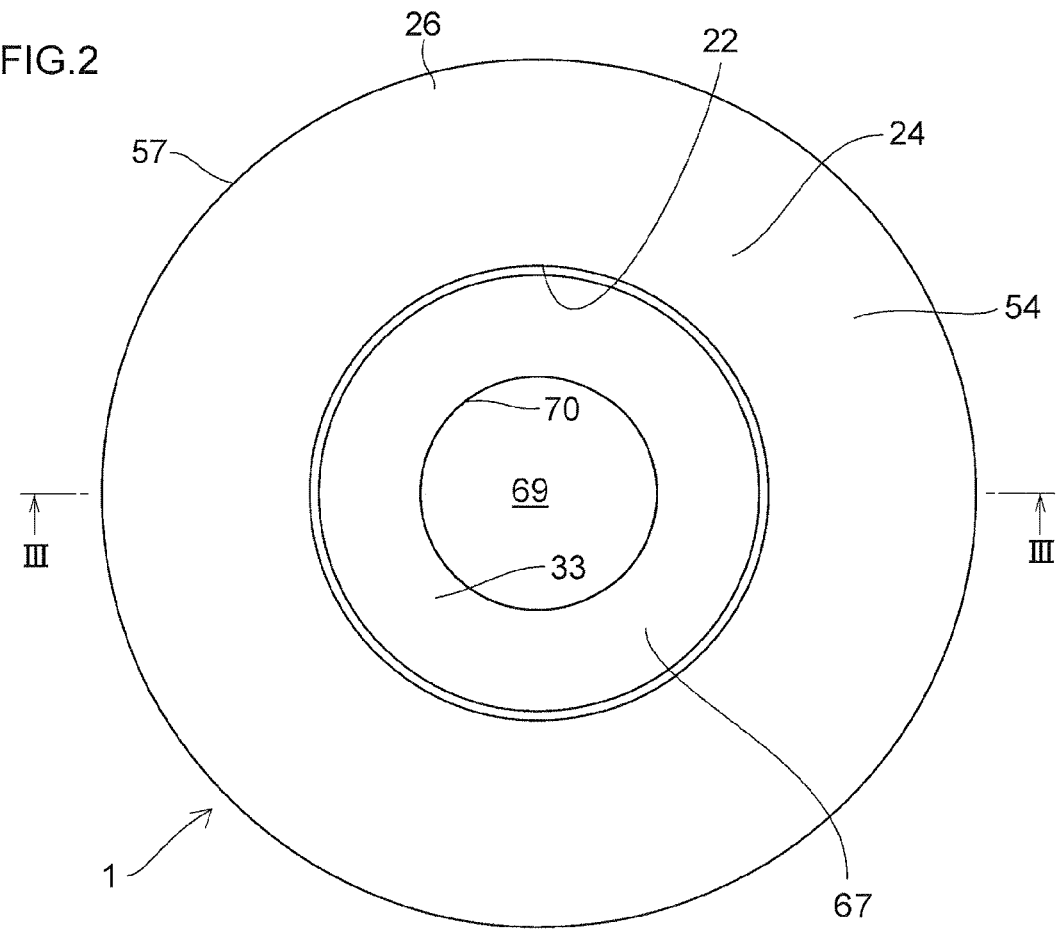

THRUST SLIDING BEARING AND COMBINATION MECHANISM OF THE THRUST SLIDING BEARING AND A PISTON ROD

This application is the U.S. national phase of International Application No. PCT/JP2012/000477, filed Jan. 25, 2012, which designated the U.S. and claims priority to JP Application 2011-076387, filed Mar. 30, 2011, the entire contents of each of which are hereby incorporated by reference.

TECHNICAL FIELD

The present invention relates to a thrust sliding bearing, and more particularly to a thrust sliding bearing which is suitably incorporated as a sliding bearing of a strut-type suspension (Macpherson type) in a four-wheeled vehicle, as well as a combination mechanism of the thrust sliding bearing and a piston rod.

BACKGROUND ART

In general, a strut-type suspension used for a front wheel of a four-wheeled vehicle has a structure in which a strut assembly incorporating a hydraulic shock absorber in an outer cylinder integrated with a main shaft is combined with a coil spring. Among such suspensions, there is a type in which when the strut assembly rotates together with the coil spring in the steering operation, the piston rod of the strut assembly rotates, and a type in which the piston rod does not rotate. In either type, there are cases where, instead of a rolling bearing, a synthetic resin-made thrust sliding bearing is used between a mechanism for mounting the strut assembly to the vehicle body and an upper spring seat member of the coil spring, so as to allow smooth rotation of the strut assembly.

PRIOR ART DOCUMENTS

Patent Documents

[Patent Document 1] JP-UM-B-8-2500
[Patent Document 2] JP-A-8-326758
[Patent Document 3] JP-A-2003-269458
[Patent Document 4] JP-A-2004-225754
[Patent Document 5] JP-A-2004-263773
[Patent Document 6] JP-A-2008-202703

SUMMARY OF THE INVENTION

Problems that the Invention is to Solve

Incidentally, in the mechanism for mounting the strut assembly to the vehicle body, a mounting plate is used for supporting one end of the piston rod of the hydraulic shock absorber, but in the case of such a mounting mechanism, the mounting plate for supporting the end of the piston rod is not only required, but the structure becomes complex, so that high cost is entailed.

With respect to such a problem, Patent Document 6 proposes a thrust sliding bearing and a combination mechanism of the thrust sliding bearing and a piston rod which make it possible to support one end of the piston rod instead of the mounting plate of the mechanism for mounting the strut assembly to the vehicle body, thereby making it possible to simplify the mounting mechanism and attain a cost reduction. The thrust sliding bearing according to this proposal is comprised of a synthetic resin-made annular bearing body having an annular upper surface and an annular engaging outer peripheral surface; a synthetic resin-made annular another bearing body which is superposed on this bearing body so as to be relatively rotatable about an axis of that bearing body and has an annular lower surface opposed to the annular upper surface of the bearing body; thrust sliding bearing means interposed between the annular upper surface of the bearing body and the annular lower surface of the other bearing body and having at least one of a lower surface and an upper surface which is in slidable contact with at least one of the annular upper surface of the bearing body and the annular lower surface of the other bearing body; an annular upper cover having an annular engaging inner peripheral surface engaging the annular engaging outer peripheral surface of the bearing body; and an annular metal plate interposed between an annular upper surface of the other bearing body and a lower surface of the annular upper cover such that a lower surface of the annular metal plate is brought into contact with the annular upper surface of the other bearing body and an upper surface thereof is brought into contact with the lower surface of the annular upper cover. In this thrust sliding bearing, the annular metal plate is provided with an annular inner peripheral surface having a smaller diameter than inside diameters of annular inner peripheral surfaces of the both bearing bodies and the annular upper cover, thereby effectively overcoming the above-described problem.

However, since the proposed thrust sliding bearing at the flat annular metal plate is arranged to be mounted to the threaded portion of the piston rod through the nut, there is a possibility that if a large force is applied to the annular metal plate through the piston rod, the annular metal plate can be deformed, generating abnormal noise in the relative rotation of the piston rod.

In addition, with the proposed thrust sliding bearing, there are problems in that not only does the number of component parts become large, but an increase in weight of that thrust sliding bearing is entailed, and the height of the thrust sliding bearing itself becomes large, so that the mounting mechanism supporting one end of the piston rod also becomes large, requiring a large mounting space.

The present invention has been devised in view of the above-described aspects, and its object is to provide a thrust sliding bearing and a combination mechanism of the thrust sliding bearing and a piston rod which, even if a large force is applied to the annular metal plate through the piston rod, make it possible to prevent the deformation of the annular metal plate, reduce the generation of abnormal noise in the relative rotation of the piston rod, and make the height low by reducing the number of the component parts.

Means for Overcoming the Problems

A thrust sliding bearing in accordance with the present invention comprises: a synthetic resin-made bearing body having a hollow cylindrical portion with a cylindrical inner peripheral surface defining a through hole, an annular collar portion integrally extending radially outwardly from a cylindrical outer peripheral surface of the hollow cylindrical portion, an annular protruding portion integrally protruding radially outwardly from a lower side of a cylindrical outer peripheral surface of the annular collar portion, a tubular projecting portion formed on an annular upper surface of the annular protruding portion and defining by a cylindrical inner peripheral surface thereof an annular outer recessed portion in cooperation with the cylindrical outer peripheral surface of the annular collar portion and the annular upper surface of the annular protruding portion, and an annular engaging projecting portion projecting radially outwardly from a cylindrical outer peripheral surface of the tubular projecting portion; an annular cover having a disk portion with an inner peripheral surface defining a through hole concentric with the through hole of the bearing body as well as an annular upper surface and an annular lower surface, a tubular portion formed integrally with the disk portion and having an inner peripheral surface, and an engaging projecting portion projecting radially inwardly from the inner peripheral surface of the tubular portion and adapted to engage the engaging projecting portion of the bearing body; an annular metal plate having a radially outwardly disposed outer disk portion having an annular upper surface coming into contact with the annular lower surface of the disk portion of the annular cover and a radially inwardly disposed inner disk portion formed integrally with the outer disk portion and disposed in the through hole defined by the inner peripheral surface of the disk portion of the annular cover; and a thrust sliding bearing means which is interposed between the bearing body and an annular lower surface of the outer disk portion of the annular metal plate and renders the annular metal plate rotatable in a direction about an axis of the bearing body with respect to the bearing body, wherein the inner disk portion has a cylindrical inner peripheral surface having a smaller diameter than a diameter of the inner peripheral surface of the hollow cylindrical portion of the bearing body and defining a through hole concentric with the both through holes, and the thrust sliding bearing means has an annular upper surface of the bearing body, an annular deep groove formed on an inner peripheral side of the annular upper surface, at least one annular shallow groove surrounding the annular deep groove and shallower in depth than the annular deep groove, and a lubricant which is filled in the annular deep groove and the annular shallow groove.

According to the thrust sliding bearing of the present invention, since the annular metal plate has the inner disk portion which is formed integrally with the outer disk portion and is disposed in the through hole defined by the inner peripheral surface of the annular cover, the inner disk portion functions like a reinforcing portion (rib) for the outer disk portion. As a result, even if a large force is applied to the annular metal plate through the piston rod, it is possible to prevent the deformation of the annular metal plate and reduce the generation of abnormal noise in the relative rotation of the piston rod ascribable to the deformation of the annular metal plate.

In addition, in the thrust sliding bearing in accordance with the present invention, since thrust sliding bearing means has an annular upper surface of the bearing body, an annular deep groove formed on an inner peripheral side of the annular upper surface, at least one annular shallow groove surrounding the annular deep groove and shallower in depth than the annular deep groove, and a lubricant which is filled in the annular deep groove and the annular shallow groove, the height of the thrust sliding bearing itself can be made low by reducing the number of component parts, so that the installation space of the thrust sliding bearing can be diminished, and overall cost reduction can be achieved.

In the present invention, the bearing body may be formed of a thermoplastic synthetic resin such as polyacetal resin, polyamide resin, and thermoplastic polyester resin, and the annular cover in a preferred embodiment is formed of a thermoplastic synthetic resin such as polyacetal resin, polyamide resin, and thermoplastic polyester resin, but may alternatively be formed of a reinforced thermoplastic synthetic resin in which such a thermoplastic synthetic resin is reinforced by an inorganic filler such as glass fiber, glass powder, glass beads, and carbon fiber or by an organic filler such as aramid fiber. The annular metal plate in a preferred embodiment is formed of a steel plate made of such as steel, stainless steel, or the like, but may alternatively be formed of a nonferrous alloy plate made of such as a copper alloy, a titanium alloy, or the like, and such an annular metal plate is preferably formed by subjecting a hot-rolled steel plate (SPHC: steel plate hot commercial) to press forming.

The thrust sliding bearing means may have a plurality of annular shallow grooves which are mutually identical in depth. Further, in the thrust sliding bearing means, the at least one annular shallow groove may have an annular wide shallow groove having a wider radial width than a radial width of the annular deep groove. Still further, the thrust sliding bearing means at the annular upper surface of the bearing body may be in contact with the annular lower surface of the outer disk portion of the annular metal plate rotatably in the direction about the axis of the bearing body, or may have a synthetic resin-made annular sheet disposed on the annular upper surface in such a manner as to cover the lubricant which is filled in the annular shallow groove and the annular deep groove. The thrust sliding bearing means having the annular sheet may be in contact at the annular upper surface of the annular sheet with the annular lower surface of the outer disk portion of the annular metal plate rotatably in the direction about the axis of the bearing body. In addition, the thrust sliding bearing means may have an electrodeposited coating which is provided on at least one of the annular lower surface of the outer disk portion of the annular metal plate. Furthermore, at least the inner disk portion of the annular metal plate may have at least one of an annular upper surface and an annular lower surface which are each coated with a ductile soft metal such as zinc, copper, or tin.

In the present invention, at least one of the lubricant, the synthetic resin-made annular sheet, and the electrodeposited coating is interposed between the annular lower surface of the outer disk portion and the annular upper surface of the bearing body of the thrust sliding bearing means, and therefore the annular upper surface of the bearing body of the thrust sliding bearing means is rendered rotatable in the direction about the axis of the bearing body with respect to the annular lower surface of the outer disk portion through at least one of the lubricant, the synthetic resin-made annular sheet, and the electrodeposited coating, with the result that the thrust sliding bearing means renders the annular metal plate rotatable with respect to the bearing body in the direction about the axis of the bearing body.

The annular cover in one embodiment has a connecting portion which is interposed between the disk portion and the tubular portion thereof and which has a cylindrical inner peripheral surface, a circular annular lower surface continuously connected to the cylindrical inner peripheral surface, and a semi spherical outer peripheral surface which is arc-shaped in cross section, and the outer disk portion of the annular metal plate has a cylindrical outer peripheral surface opposing the cylindrical inner peripheral surface of the connecting portion in the radial direction.

The annular metal plate may have an inclined connecting portion interposed between the outer disk portion and the inner disk portion and continuously connected to the inner disk portion in such a manner as to extend diagonally upwardly from an inner peripheral side of the outer disk portion and an downwardly protruding portion formed integrally with the outer disk portion and suspended downwardly from an outer peripheral side of the annular lower surface of the outer disk portion in such a manner as to envelop an upper edge portion of the outer peripheral surface of the annular collar portion.

In a preferred embodiment, the annular cover has a connecting portion interposed between the disk portion and the tubular portion thereof and having a semispherical outer peripheral surface and a semispherical inner peripheral surface which are arc-shaped in cross section, and the outer disk portion of the annular metal plate has a semispherical outer peripheral surface which opposes the semispherical inner peripheral surface of the connecting portion of the annular cover, while the inner disk portion of the annular metal plate has an annular lower surface continuously connected to the annular lower surface of the outer disk portion and flush with the annular lower surface of the outer disk portion.

A combination mechanism of a thrust sliding bearing and a piston rod, or a combination mechanism for use in a strut-type suspension in a four-wheeled vehicle in a preferred embodiment, comprises: the thrust sliding bearing according to any one of the above-described embodiment; and a piston rod of a shock absorber, wherein the piston rod includes a large-diameter portion disposed in a through hole defined by an inner peripheral surface of the hollow cylindrical portion of the bearing body, a small-diameter portion whose diameter is smaller than the large-diameter portion and which is formed integrally with the large-diameter portion and is disposed in a through hole defined by the cylindrical inner peripheral surface of the inner disk portion of the annular metal plate, and a threaded portion formed on the small-diameter portion, and wherein the annular metal plate at the inner disk portion is clamped by an annular stepped surface between the large-diameter portion and the small-diameter portion of the piston rod and an annular surface of a nut threadedly engaged with the threaded portion.

In at least the inner disk portion of such an annular metal plate, if at least one of the annular upper surface and the annular lower surface of the inner disk portion, which are clamped by the annular surface of the nut and the annular stepped surface between the large-diameter portion and the small-diameter portion of the piston rod, is coated with a ductile soft metal such as zinc, copper, or tin, at least one pair of corresponding ones between the annular stepped surface and the annular surface of the nut, on the one hand, and the annular upper surface and the annular lower surface of the inner disk portion, on the other hand, can be brought into substantially total contact with each other, thereby making it possible to avoid local contact and disperse the stress when it is applied in the axial direction from the piston rod. As a result, it is possible to avoid the occurrence of damage, such as a crack, to the inner disk portion.

Advantages of the Invention

According to the present invention, it is possible to provide a thrust sliding bearing and a combination mechanism of the thrust sliding bearing and a piston rod which, even if a large force is applied to the annular metal plate through the piston rod, make it possible to prevent the deformation of the annular metal plate, reduce the generation of abnormal noise in the relative rotation of the piston rod ascribable to the deformation of the annular metal plate, and make the height low by reducing the number of the component parts.

BRIEF DESCRIPTION OF THE DRAWINGS

FIG. 1 is a front cross-sectional view of an embodiment of the present invention;

FIG. 2 is a plan view of the embodiment of FIG. 1;

MODE FOR CARRYING OUT THE INVENTION

Figure 3:
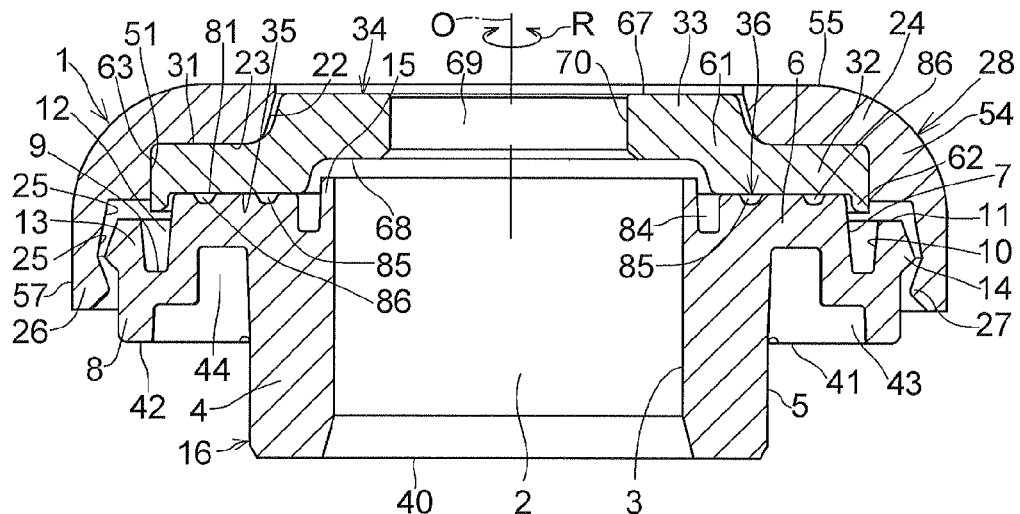
FIG. 3 is a cross-sectional view, taken in the direction of arrows along line III-III shown in FIG. 2, of the embodiment of FIG. 1.
Figure 4:
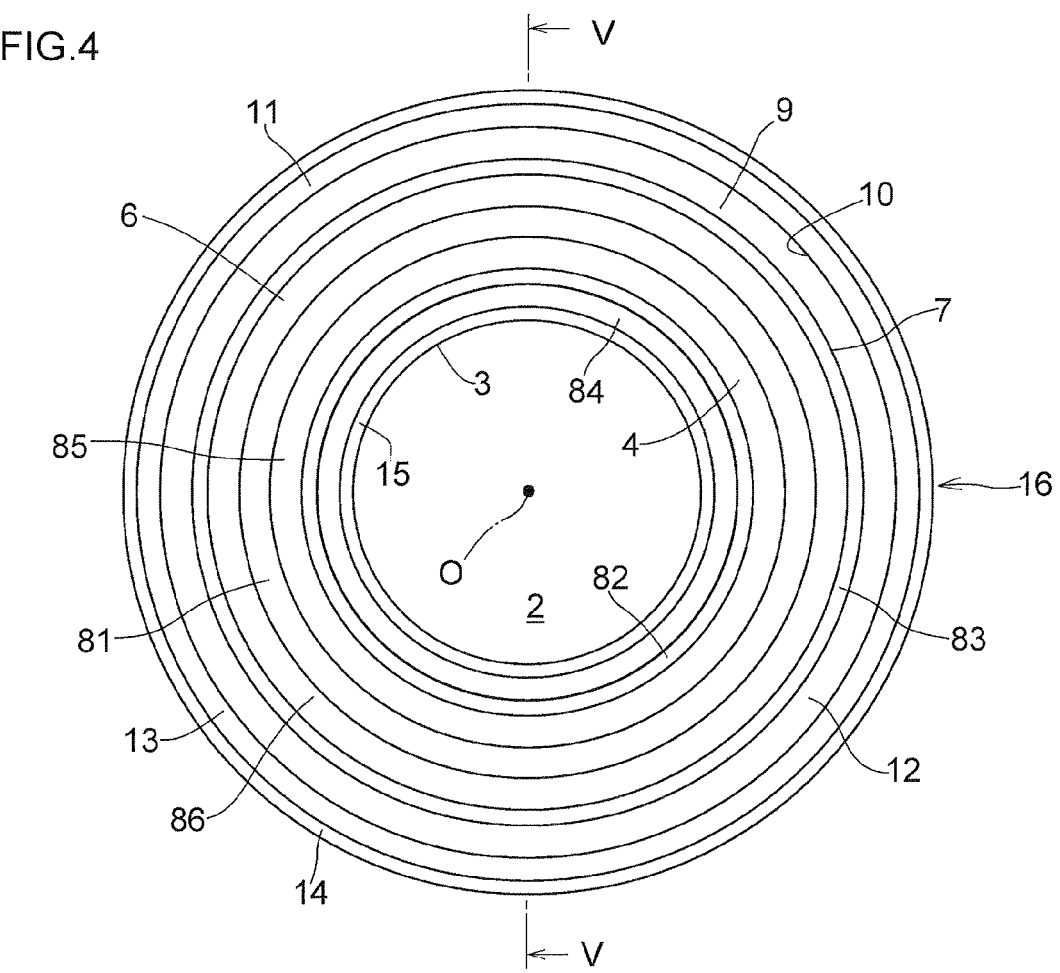
FIG. 4 is a plan view of a bearing body in the embodiment of FIG. 1.
Figure 5:
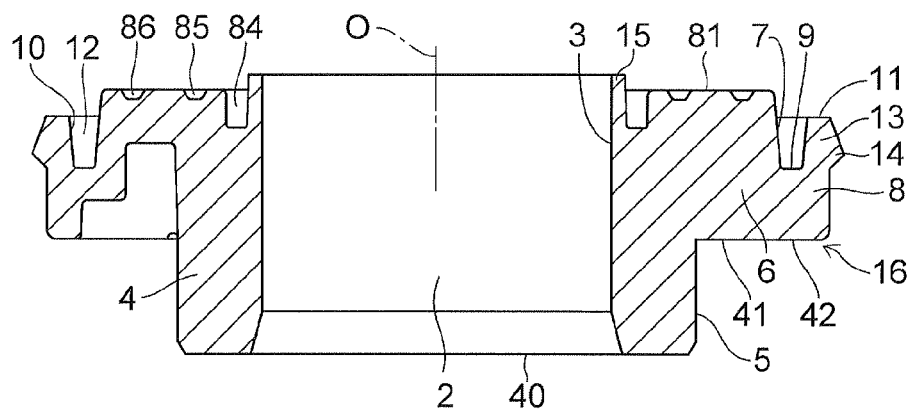
FIG. 5 is a cross-sectional view, taken in the direction of arrows along line V-V shown in FIG. 4, of the bearing body in the embodiment of FIG. 1.
Figure 6:
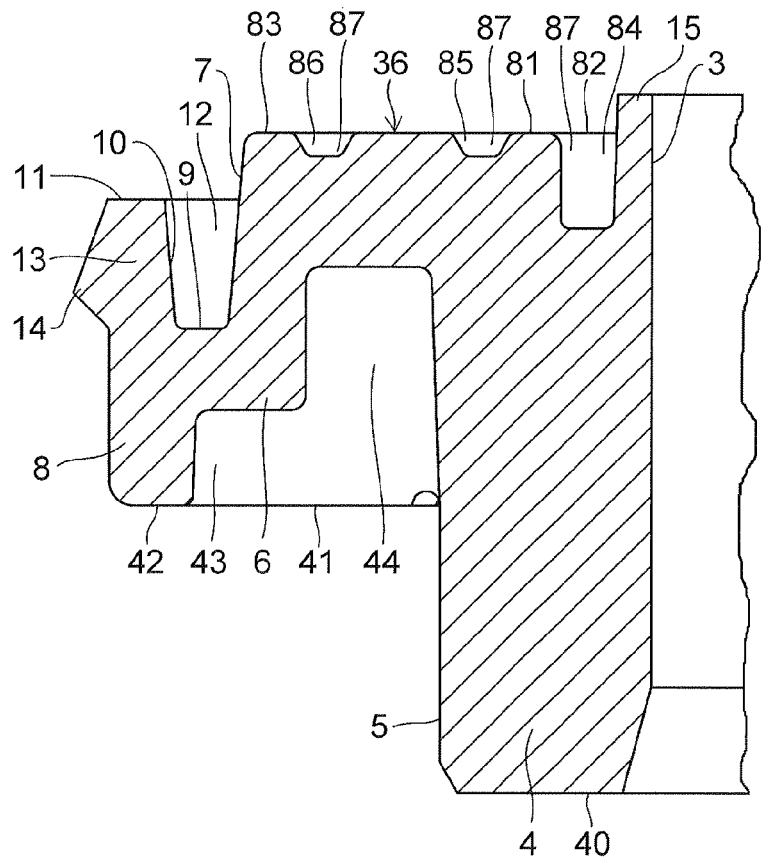
FIG. 6 is a partially enlarged cross-sectional view of the bearing body in the embodiment of FIG. 1.
Figure 7:
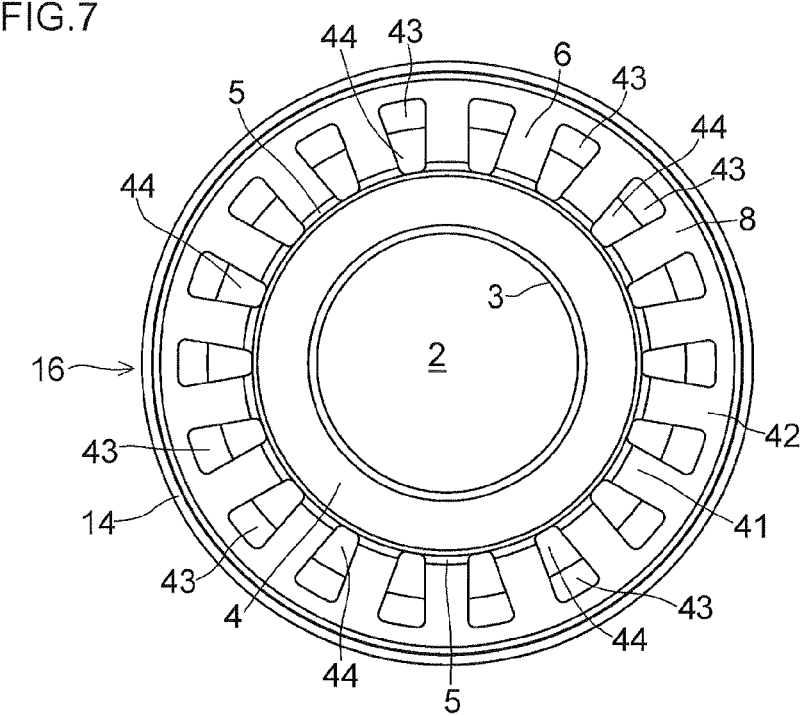
FIG. 7 is a bottom view of the bearing body in the embodiment of FIG. 1.
Figure 8:
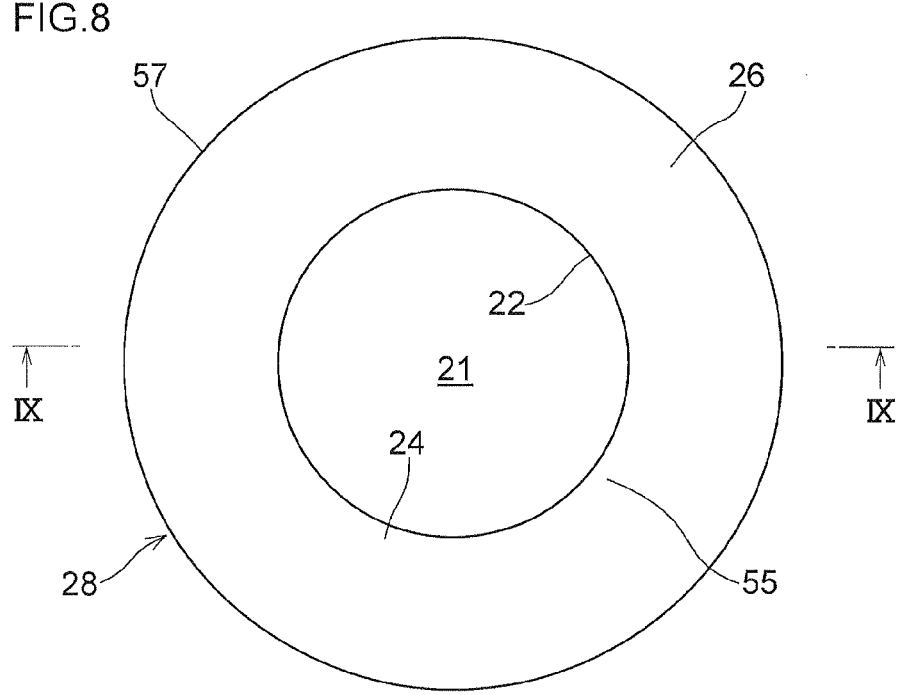
FIG. 8 is a plan view of an annular cover in the embodiment of FIG. 1.
Figure 9:
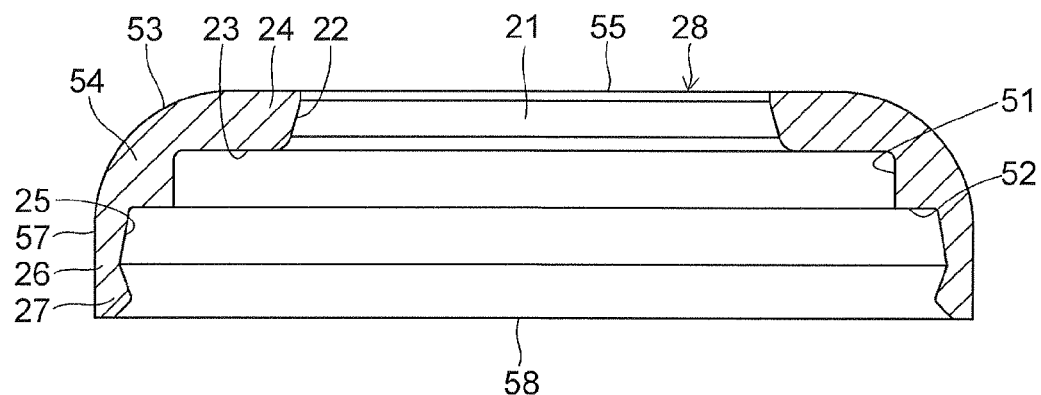
FIG. 9 is a cross-sectional view, taken in the direction of arrows along line IX-IX shown in FIG. 8, of the annular cover in the embodiment of FIG. 1.
Figure 10:
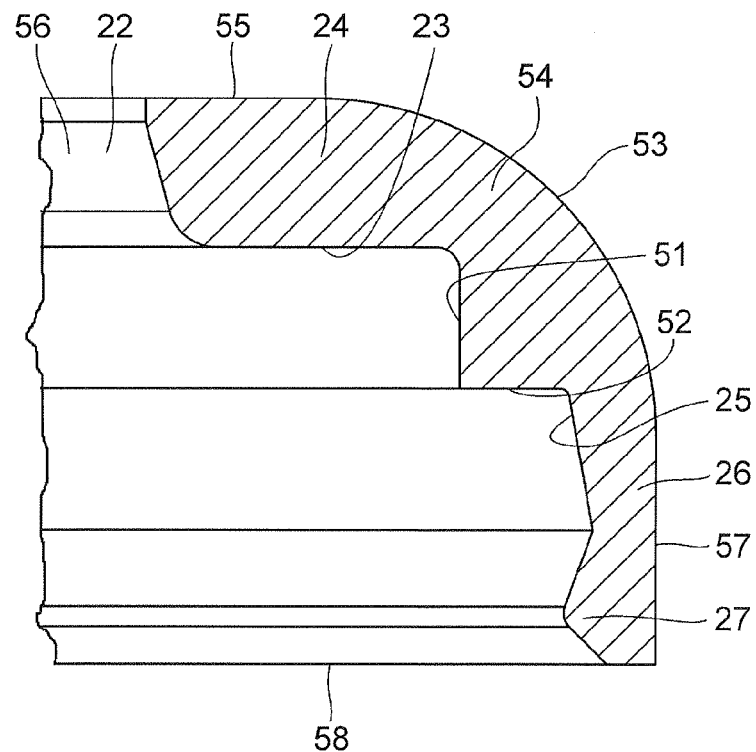
FIG. 10 is a partially enlarged cross-sectional view of the annular cover in the embodiment of FIG. 1.
Figure 11:
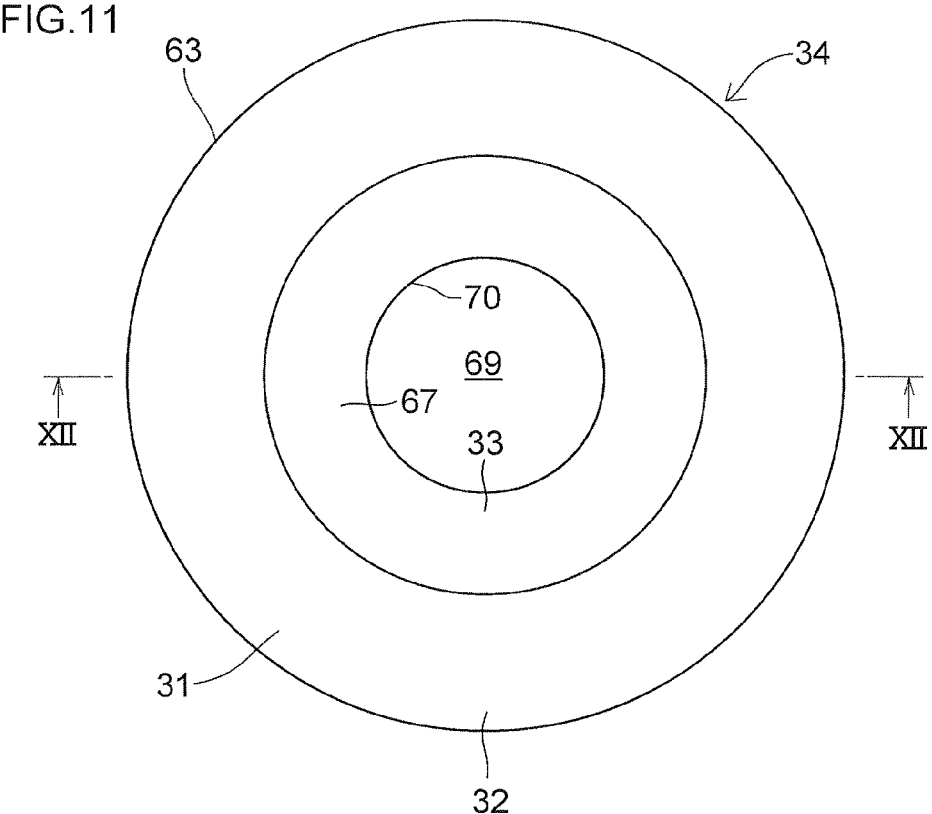
FIG. 11 is a plan view of an annular metal plate in the embodiment of FIG. 1.
Figure 12:
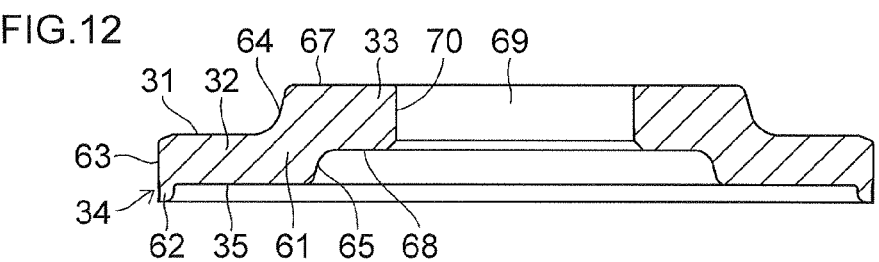
FIG. 12 is a cross-sectional view, taken in the direction of arrows along line XII-XII shown in FIG. 11, of the annular metal plate in the embodiment of FIG. 1.
Figure 13:
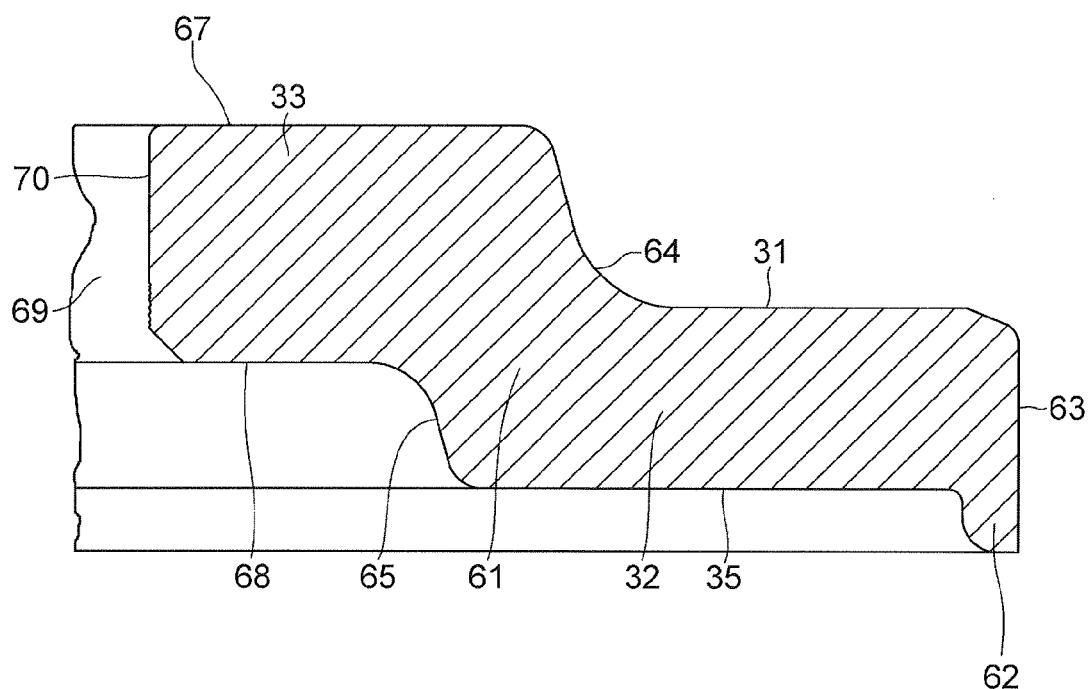
FIG. 13 is a partially enlarged cross-sectional view of the annular metal plate in the embodiment of FIG. 1.

Hereafter, a more detailed description will be given of the mode for carrying out the invention on the basis of preferred embodiments illustrated in the drawings. It should be noted that the present invention is not limited to these embodiments.

In FIGS. 1 to 13, a thrust sliding bearing 1 of this embodiment includes a synthetic resin-made bearing body 16 having a hollow cylindrical portion 4 with a cylindrical inner peripheral surface 3 defining a through hole 2, an annular collar portion 6 integrally extending radially outwardly from a cylindrical outer peripheral surface 5 of the hollow cylindrical portion 4, an annular protruding portion 8 integrally protruding radially outwardly from a lower side of a cylindrical outer peripheral surface 7 of the annular collar portion 6, a tubular projecting portion 13 formed integrally on an annular upper surface 9 of the annular protruding portion 8 and defining an annular outer recessed portion 12, which opens at an annular upper surface 11, in cooperation with the cylindrical outer peripheral surface 7 of the annular collar portion 6 and the annular upper surface 9 of the annular protruding portion 8, an annular engaging projecting portion 14 integrally projecting radially outwardly from a cylindrical outer peripheral surface of the tubular projecting portion 13, and an annular projecting portion 15 formed integrally on the inner peripheral surface 3 side of the hollow cylindrical portion 4; an annular cover 28 having a disk portion 24 with an inner peripheral surface 22 defining a through hole 21 concentric with the through hole 2 of the bearing body 16 as well as an annular lower surface 23 continuously connected to a lower edge of that inner peripheral surface 22, a tubular portion 26 formed integrally with the disk portion 24 and having an inner peripheral surface 25 constituted by a truncated conical surface, and an engaging projecting portion 27 integrally projecting radially inwardly from the inner peripheral surface 25 of the tubular portion 26 and adapted to elastically engage the engaging projecting portion 14 of the bearing body 16; an annular metal plate 34 having a radially outwardly disposed outer disk portion 32 having an annular upper surface 31 coming into contact with the annular lower surface 23 of the disk portion 24 of the annular cover 28 and a radially inwardly disposed inner disk portion 33 formed integrally with the outer disk portion 32 and disposed in the through hole 21 defined by the inner peripheral surface 22 of the disk portion 24 of the annular cover 28; and a thrust sliding bearing means 36 which is interposed between the bearing body 16 and an annular lower surface 35 of the outer disk portion 32 of the annular metal plate 34 and renders the annular metal plate 34 rotatable with respect to the bearing body 16 in an R direction about an axis O of the bearing body 16.

In the synthetic resin-made bearing body 16 formed of a thermoplastic synthetic resin such as polyacetal resin, polyamide resin, and polyester resin (polybutylene terephthalate resin), the hollow cylindrical portion 4 has an annular lower surface 40 in addition to the inner peripheral surface 3 and the outer peripheral surface 5, and a plurality of lower recesses 43 arranged in such a manner as to be spaced apart from each other in the R direction and a plurality of lower recesses 44, each one being radially adjacent to and deeper than the lower recess 43, are formed in an annular lower surface 41 of the annular collar portion 6 which is disposed higher than the annular lower surface 40 and in an annular lower surface 42 of the annular protruding portion 8 flush with that annular lower surface 41.

The annular cover 28, which is formed of a thermoplastic synthetic resin such as polyacetal resin, polyamide resin, and polyester resin (polybutylene terephthalate resin) or a reinforced thermoplastic synthetic resin in which such a thermoplastic synthetic resin is reinforced by an inorganic filler such as glass fiber, glass powder, glass beads, and carbon fiber or by an organic filler such as aramid resin fiber, has a connecting portion 54 which is interposed between the disk portion 24 and the tubular portion 26 and which has a cylindrical inner peripheral surface 51, an annular lower surface 52 continuously connected to a lower edge of that cylindrical inner peripheral surface 51, and a semispherical outer peripheral surface 53 which is arc-shaped in cross section. The disk portion 24 has, in addition to the inner peripheral surface 22 and the annular lower surface 23, an annular upper surface 55 continuously connected at its outer edge to an upper edge of the semispherical outer peripheral surface 53, and the inner peripheral surface 22 of the disk portion 24 has a truncated conical surface 56, while the tubular portion 26 has, in addition to the inner peripheral surface 25, an annular lower surface 58 and a cylindrical outer peripheral surface 57 which is continuously connected at its upper edge to a lower edge of the semispherical outer peripheral surface 53.

The annular metal plate 34, which is preferably formed by subjecting a hot-rolled steel plate (SPHC: steel plate hot commercial) to press forming, has, in addition to the outer disk portion 32 and the inner disk portion 33, an inclined connecting portion 61 interposed between the outer disk portion 32 and the inner disk portion 33 and continuously connected to the inner disk portion 33 in such a manner as to extend diagonally upwardly from an inner peripheral side of the outer disk portion 32, as well as an annular downwardly protruding portion 62 formed integrally with the outer disk portion 32 and suspended downwardly from an outer peripheral side of the annular lower surface 35 of the outer disk portion 32 in such a manner as to envelop an upper edge portion of the outer peripheral surface 7 of the annular collar portion 6.

The outer disk portion 32 disposed between, on the one hand, the hollow cylindrical portion 4 and the annular collar portion 6 and, on the other hand, the disk portion 24 in the axial direction has, in addition to a cylindrical outer peripheral surface 63 opposed to the cylindrical inner peripheral surface 51 of the connecting portion 54 in the radial direction. The inclined connecting portion 61 has an inclined outer peripheral surface 64 opposed to the truncated conical surface 56 of the annular cover 28 in the radial direction, as well as an inclined inner peripheral surface 65 extending in parallel to the inclined outer peripheral surface 64. The inner disk portion 33 which is disposed in the through hole 21 has an annular upper surface 67 continuously connected to an upper edge of the inclined outer peripheral surface 64 and exposed upwardly in the through hole 21, an annular lower surface 68 extending in parallel to the annular upper surface 67, and a cylindrical inner peripheral surface 70 having a smaller diameter than the diameter of the inner peripheral surface 3 of the hollow cylindrical portion 4 of the bearing body 16 and defining a through hole 69 concentric with both through holes 2 and 21.

The annular metal plate 34 is preferably formed by subjecting a hot-rolled steel plate (SPHC) to press forming. In this case, at least the below-described annular upper surface 67 and annular lower surface 68 (clamped surfaces) of the inner disk portion 33, which are clamped by an annular surface of a nut and an annular stepped surface between a large-diameter portion and a small-diameter portion of a piston rod, are preferably coated with a ductile soft metal such as zinc, copper, or tin. As such metal plating is provided, the annular stepped surface of the piston rod and the annular surface of the nut, on the one hand, and the annular upper surface 67 and the annular lower surface 68 of the inner disk portion 33, on the other hand, are brought into substantially total contact with each other, thereby making it possible to avoid local contact and disperse the stress when it is applied in the axial direction from the piston rod. As a result, damage, such as a crack, to the inner disk portion 33 and the outer disk portion 32 formed integrally with the inner disk portion 33 does not occur.

The thrust sliding bearing means 36 includes an annular upper surface 82 of the hollow cylindrical portion 4, i.e., an annular upper surface 81 of the bearing body 16 which is brought into slidable contact with the annular lower surface 35 of the outer disk portion 32 in the R direction, as well an annular upper surface 83 of the annular collar portion flush 6 with the annular upper surface 82; an annular deep groove 84 formed in the annular upper surface 82 on the inner peripheral side of the annular upper surface 81; annular shallow grooves 85 and 86 which are formed in the annular upper surfaces 82 and 83 on the radially outer side of the annular deep groove 84 in such a manner as to surround the annular deep groove 84 and which are shallower in depth than the annular deep groove 84 but are mutually identical in depth; and a lubricant 87 such as grease which is filled in the annular deep groove 84 and the annular shallow grooves 85 and 86. The annular shallow groove 85 is formed in the annular upper surface 82, while the annular shallow groove 86 is formed in the annular upper surface 83 on the radially outer side of the annular shallow groove 85 in such a manner as to surround that annular shallow groove 85. Such a thrust sliding bearing means 36 at its annular upper surface 81 with the lubricant 87 spread thereon is in contact with the annular lower surface 35 of the outer disk portion 32 of the annular metal plate 34 rotatably in the R direction about the axis O.

In the above-described thrust sliding bearing 1, the bearing body 16 and the annular cover 28 are superposed on and coupled to each other with the annular metal plate 34 clamped therebetween in the axial direction (vertical direction) by the elastic fitting (snap fitting) of the engaging projecting portion 27 with respect to the engaging projecting portion 14 making use of the flexibility of the synthetic resin. In the relative rotation of the annular metal plate 34 with respect to the bearing body 16 about the axis O in the R direction, sliding in the R direction is caused to take place between, on the one hand, the annular upper surfaces 82 and 83 of the thrust sliding bearing means 36 which is interposed between the bearing body 16 and an annular lower surface 35 of the outer disk portion 32 of the annular metal plate 34 and the annular lower surface 35 of the outer disk portion 32 of the annular metal plate 34 which is in contact with the annular upper surfaces 82 and 83, thereby allowing the relative rotation of the annular metal plate 34 with respect to the bearing body 16 about the axis O in the R direction to be effected with low frictional torque.

Figure 14:
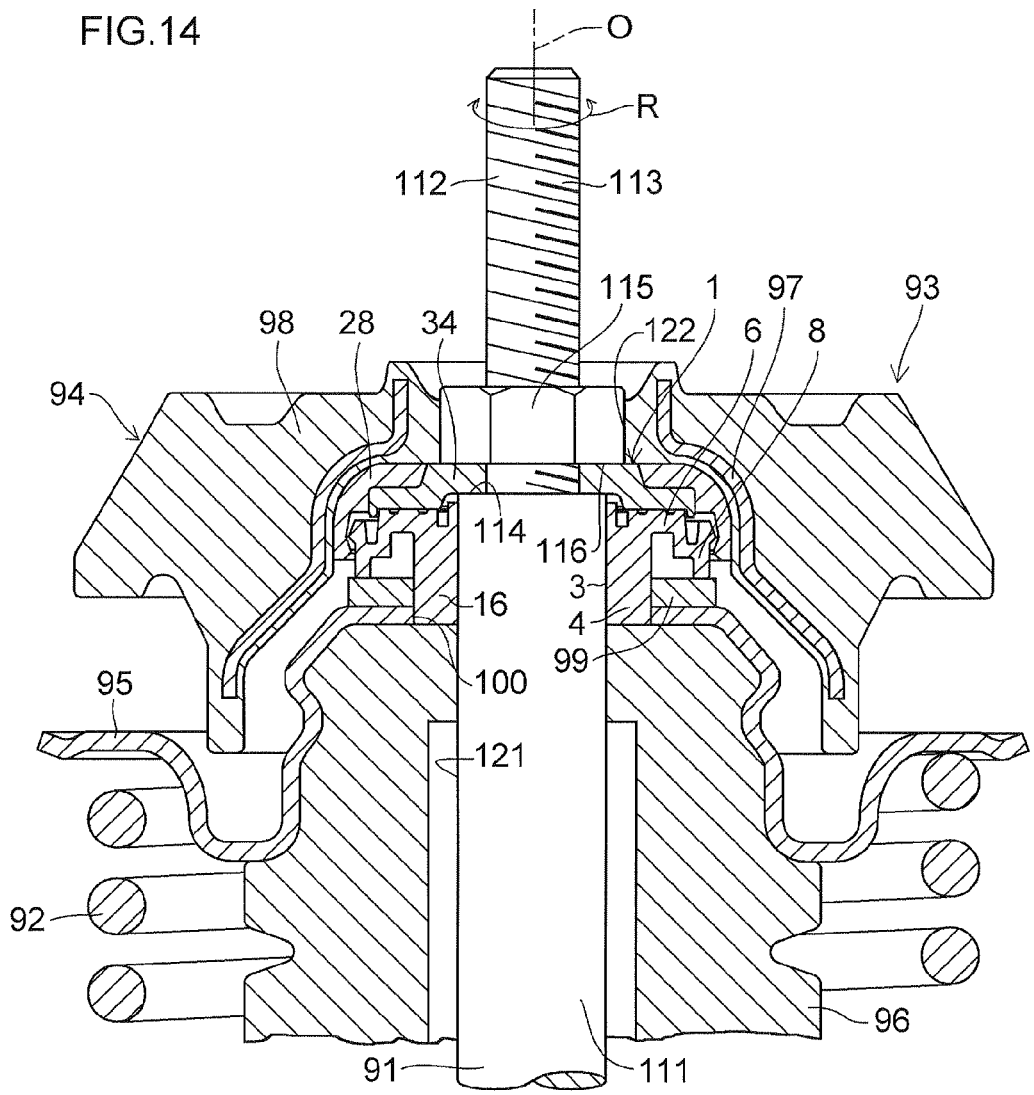
FIG. 14 is a cross-sectional view of an embodiment in which the embodiment shown in FIG. 1 is used in a strut-type suspension.

As shown in FIG. 14, such a thrust sliding bearing 1 is used when a strut-type suspension 93 of a vehicle, which includes a hydraulic shock absorber (not shown) having a piston rod 91 therein and a coil spring 92 disposed so as to surround such a hydraulic shock absorber, is mounted to a vehicle body by means of a mounting mechanism 94.

The strut-type suspension 93 of a vehicle, e.g., a four-wheeled vehicle, includes, in addition to the hydraulic shock absorber and the coil spring 92, an upper spring seat member 95 for receiving one end of the coil spring 92 and a bump stopper 96 disposed so as to surround the piston rod 91. The mounting mechanism 94 includes a rubber-made resilient member 98 with a core metal 97 embedded therein, as well as a spacer member 99 interposed between, on the one hand, the upper spring seat member 95 and the annular collar portion 6 of the bearing body 16 and, on the other hand, the respective annular lower surfaces 41 and 42 of the annular protruding portion 8. The thrust sliding bearing 1 is disposed between the resilient member 98 of the mounting mechanism 94 and the upper spring seat member 95 of the strut-type suspension 93 through the spacer member 99. Moreover, a lower end portion of the hollow cylindrical portion 4 is inserted in a central through hole 100 of the upper spring seat member 95, to be thereby positioned by the upper spring seat member 95 concerning a direction perpendicular to the axis O, i.e., in the radial direction, and the inner peripheral surface of the spacer member 99 is in contact with the outer peripheral surface 5 of the hollow cylindrical portion 4. The resilient member 98 enveloping the thrust sliding bearing 1 is disposed with its inner peripheral surface brought into contact with the semi-spherical outer peripheral surface 53, the annular upper surface 55, and the cylindrical outer peripheral surface 57 of the annular cover 28.

The piston rod 91 includes a large-diameter portion 111 disposed by being passed through the through hole 2, a small-diameter portion 112 whose diameter is smaller than the large-diameter portion 111 and which is formed integrally with the large-diameter portion 111 and is disposed by being passed through the through hole 69 of the annular metal plate 34, and a threaded portion 113 formed on the small-diameter portion 112. Between, on the one hand, an annular stepped surface 114 between the large-diameter portion 111 and the small-diameter portion 112 of the piston rod 91 and, on the other hand, an annular surface 116 of a nut 115 threadedly engaged with the threaded portion 113, the annular metal plate 34 at its inner disk portion 33 is clamped by the annular stepped surface 114 and the annular surface 116.

The large-diameter portion 111 at its outer peripheral surface 121 is in contact with the inner peripheral surface 3 of the bearing body 16 defining the through hole 2 rotatably in the R direction, and the nut 115 at its outer peripheral surface is in contact with an annular inner peripheral surface 122 of the resilient member 98, is threadedly engaged with the threaded portion 113 so as not to rotate in the R direction with respect to the resilient member 98, and is fixed to the piston rod 91. The annular cover 28 is held by the resilient member 98 by means of the annular metal plate 34 whose inner disk portion 33 is clamped by the annular stepped surface 114 and the annular surface 116, so as not to rotate in the R direction with respect to the piston rod 91.

In the above-described combination mechanism of the thrust sliding bearing 1 and the piston rod 91, when the coil spring 92 is rotated around the axis O in the R direction by the steering operation, the bearing body 16 is similarly rotated relatively in the R direction with respect to the annular metal plate 34. This rotation of the bearing body 16 is allowed by the sliding contact in the R direction between, on the one hand, the annular upper surfaces 82 and 83 of the thrust sliding bearing means 36 and the lubricant 87 such as grease spread on the annular upper surfaces 82 and 83 and filled in the annular deep groove 84 and the annular shallow grooves 85 and 86 and, on the other hand, the annular lower surface 35 of the outer disk portion 32 of the annular metal plate 34 which is in contact therewith, so that the steering operation is performed without resistance.

With the thrust sliding bearing 1, since the bearing body 16 is disposed rotatably in the R direction with respect to the annular lower surface 35 of the annular metal plate 34 by the annular upper surfaces 82 and 83 of the thrust sliding bearing means 36 and the lubricant 87 spread on the annular upper surfaces 82 and 83, the thrust sliding bearing 1 can be constructed by three parts including the bearing body 16, the annular metal plate 34, and the annular cover 28. As a result, the height of the thrust sliding bearing 1 itself can be made low by reducing the number of component parts, so that the installation space of the thrust sliding bearing 1 can be diminished, and overall cost reduction can be achieved. Moreover, one end of the piston rod 91 can be supported by the annular metal plate 34, and it is possible to eliminate a mounting member for supporting one end of the piston rod 91 in the mechanism for mounting the strut-type suspension 93 to the vehicle body, thereby making it possible to simplify the mounting mechanism and attain cost reduction.

In addition, according to the thrust sliding bearing 1, since the annular metal plate 34 has the inner disk portion 33 which is formed integrally with the outer disk portion 32 through the inclined connecting portion 61 and is disposed in the through hole 21 defined by the inner peripheral surface 22 of the annular cover 28, the inner disk portion 33 functions like a reinforcing portion (rib) for the outer disk portion 32. As a result, even if a large force is applied to the annular metal plate 34 through the piston rod 91, it is possible to prevent the deformation of the annular metal plate 34 and reduce the generation of abnormal noise in the relative rotation of the piston rod 91 in the R direction ascribable to the deformation of the annular metal plate 34.

In addition, with the thrust sliding bearing 1, the wall thickness of the annular collar portion 6 and the annular protruding portion 8 formed integrally on the lower side of the outer peripheral surface 7 of the annular collar portion 6 can be made uniform by the lower recesses 43 and 44 formed on the annular lower surface 41 of the annular collar portion 6 and the annular lower surface 42 of the annular protruding portion 8, thereby making it possible to overcome molding defects and dimensional defects ascribable to nonuniformity of wall thickness during molding. However, in cases where such effects are not particularly required, the lower recesses 43 and 44 may not be particularly provided.

Furthermore, according to the thrust sliding bearing 1, since the annular protruding portion 62 is adapted to engage the outer peripheral surface 7 of the annular collar portion 6 of the bearing body 16, it is possible to hold the relative radial positions of the annular metal plate 34 and the bearing body 16.

In the thrust sliding bearing 1, as at least the annular upper surface 67 and the annular lower surface 68 of the inner disk portion 33, which are clamped by the annular surface 116 of the nut 115 and the annular stepped surface 114 between the large-diameter portion 111 and the small-diameter portion 112 of the piston rod 91, are coated with a ductile soft metal such as zinc, copper, or tin, the annular stepped surface 114 and the annular surface 116, on the one hand, and the annular upper surface 67 and the annular lower surface 68 of the inner disk portion 33 clamped by the annular stepped surface 114 and the annular surface 116, on the other hand, can be brought into substantially total contact with each other, thereby making it possible to avoid local contact and disperse the stress when it is applied in the axial direction from the piston rod 91. As a result, it is possible to avoid the occurrence of damage, such as a crack, to the inner disk portion 33.

Figure 15:
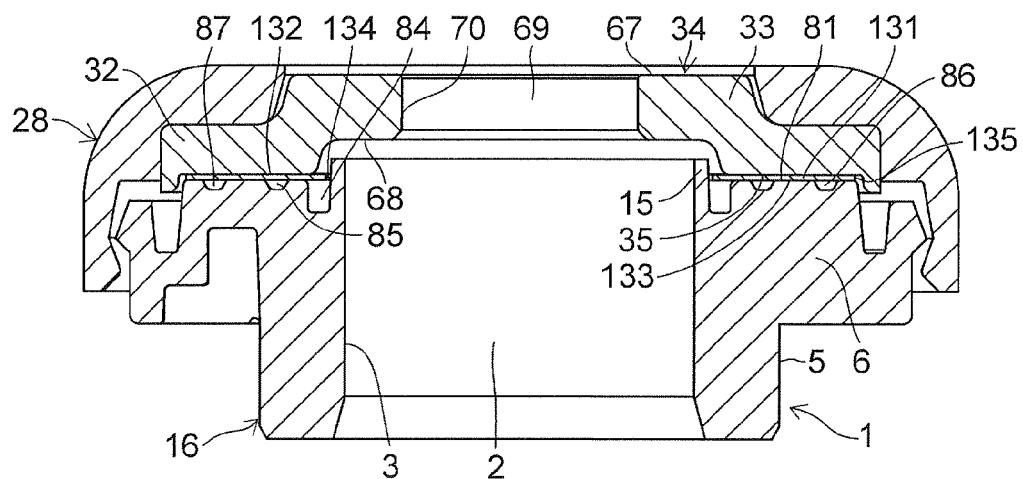
FIG. 15 is a cross-sectional view of another embodiment of the present invention.
Figure 16:
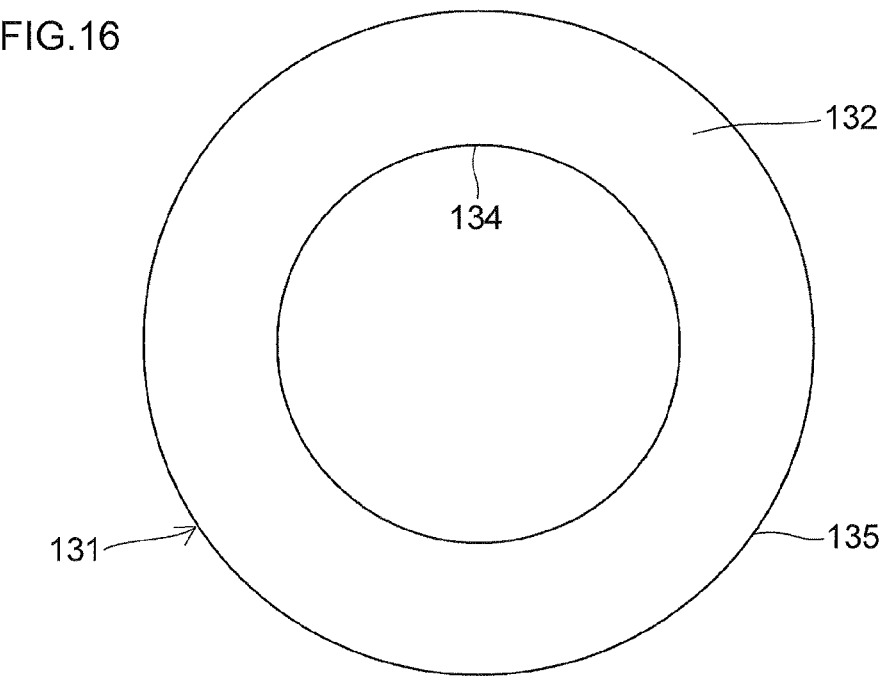
FIG. 16 is a plan view of a sheet in the embodiment of FIG. 15.

As shown in FIGS. 15 and 16, the thrust sliding bearing means 36 may have a synthetic resin-made annular sheet 131 disposed on the annular upper surface 81 in such a manner as to cover the lubricant 87 such as grease which is filled in the annular grooves 84, 85, and 86, in addition to the annular upper surface 81, the annular deep groove 84, the annular shallow grooves 85 and 86, and the lubricant 87. The annular sheet 131 is interposed between the annular upper surface 81 and the annular lower surface 35 of the outer disk portion 32 of the annular metal plate 34, and the annular sheet 131 at its annular upper surface 132 is in contact with the annular lower surface 35 of the outer disk portion 32 of the annular metal plate 34, while the annular sheet 131 at its annular lower surface 133 is in contact with the annular upper surface 81, so as to be rotatable in the R direction, respectively. With such a thrust sliding bearing means 36, the annular metal plate 34 is rendered rotatable with respect to the bearing body 16 in the R direction about the axis O of the bearing body 16 by at least one of the sliding in the R direction of the annular lower surface 133 of the annular sheet 131 with respect to the annular upper surface 81 and the sliding in the R direction of the annular upper surface 132 of the annular sheet 131 with respect to the annular lower surface 35 of the annular metal plate 34, and the lubricant 87 filled in the annular deep groove 84 and the annular shallow grooves 85 and 86 sealed by the annular sheet 131 is adapted to support the axial load from the annular sheet 131.

The synthetic resin-made annular sheet 131 is preferably formed of a synthetic resin including at least one of polyacetal resin, polyamide resin, polyester resin, polyolefin resin, polycarbonate resin, and fluororesin, may have the annular inner peripheral surface 134 of an inside diameter greater than the outside diameter of the annular projecting portion 15 of the bearing body 16 and the outer peripheral surface 135 of an outside diameter smaller than the outside diameter of the outer peripheral surface 7 of the annular collar portion 6, and may have an axial thickness of 0.05 mm to 1.0 mm.

In the thrust sliding bearing 1 shown in FIGS. 15 and 16, in the relative rotation of the annular metal plate 34 in the R direction about the axis O with respect to the bearing body 16, the sliding of synthetic resins between the annular upper surface 132 of the annular sheet 131 and the annular lower surface 35 of the outer disk portion 32 of the annular metal plate 34, or the sliding of synthetic resins between the annular lower surface 133 of the annular sheet 131 and the annular upper surface 81 of the bearing body 16 through the lubricant 87, preferably the former sliding, is caused to take place, thereby allowing the relative rotation of the annular metal plate 34 in the R direction with respect to the bearing body 16 about the axis O to be effected with extremely low frictional torque. Moreover, since the arrangement provided is such that the annular sheet 131 having a thin thickness of 0.05 to 1.0 mm or thereabouts is merely interposed in the thrust sliding bearing means 36 described earlier, also with the thrust sliding bearing 1 shown in FIGS. 15 and 16, its own height can be made low, its installation space can be diminished, and overall cost reduction can be attained.

Figure 17:
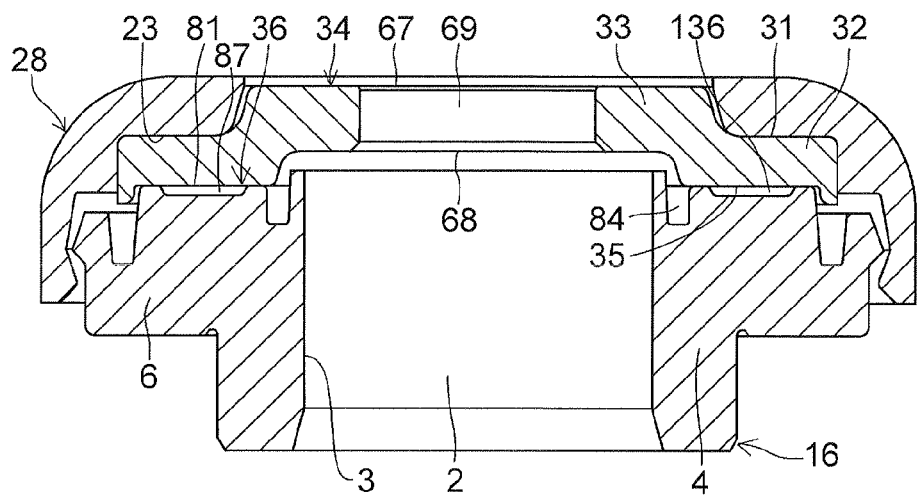
FIG. 17 is a cross-sectional view of still another embodiment of the present invention.

In each thrust sliding bearing 1 described above, the thrust sliding bearing means 36 has the annular deep groove 84 and the annular shallow grooves 85 and 86, but, as shown in FIG. 17, the thrust sliding bearing means 36 may alternatively have the annular deep groove 84, an annular wide shallow groove 136 having a wider width than the radial width of the annular deep groove 84 and the annular shallow grooves 85 and 86, and the lubricant 87 filled in the annular deep groove 84 and the annular wide shallow groove 136. The thrust sliding bearing means 36 shown in FIG. 17 may also have the synthetic resin-made annular sheet 131 shown in FIGS. 15 and 16 and disposed on the annular upper surface 81 in such a manner as to cover the lubricant 87 such as grease which is filled in the annular deep groove 84 and the annular wide shallow groove 136.

In the thrust sliding bearing 1 shown in FIGS. 1 to 13, the thrust sliding bearing means 36 may have, in addition to the annular upper surface 81, the annular deep groove 84, and the annular shallow grooves 85 and 86, an electrodeposited coating which is provided on the annular lower surface 35 of the outer disk portion 32, and such an electrodeposited coating may be preferably effected by cathodic electrodeposition of resin paint so as to obtain a resin coating as an electrodeposited coating having low frictional properties, but other electrodeposition may be effected.

Such an electrodeposited coating may be applied to the thrust sliding bearing means 36 of the thrust sliding bearing 1 shown in FIGS. 15 and 16 or 17.

Figure 18:
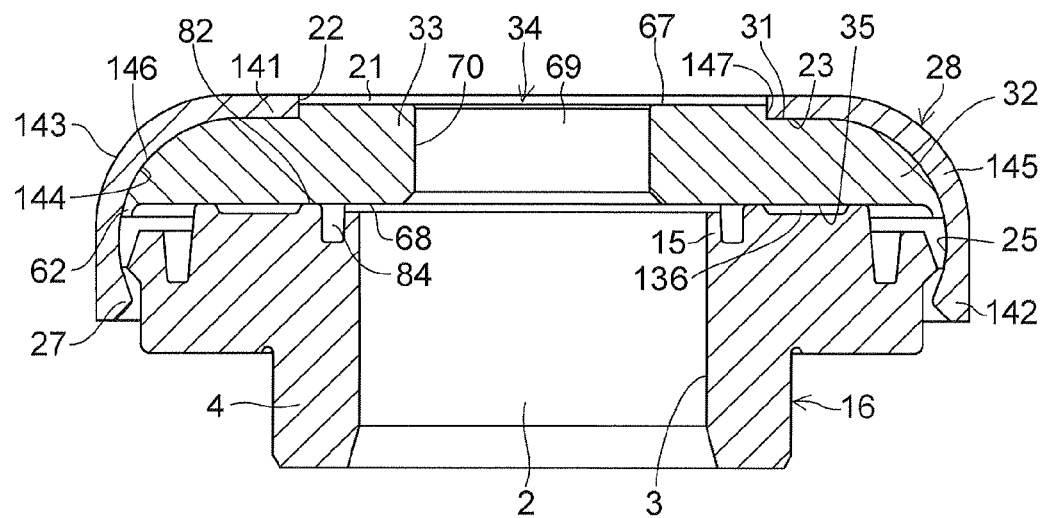
FIG. 18 is a cross-sectional view of a further embodiment of the present invention.

In the above-described thrust sliding bearing 1, the annular cover 28 has the disk portion 24, the tubular portion 26 formed integrally with the disk portion 24, the engaging projecting portion 27 projecting radially inwardly from the inner peripheral surface 25 of the tubular portion 26, and the connecting portion 54 interposed between the disk portion 24 and the tubular portion 26, and the annular metal plate 34 has the outer disk portion 32, the inner disk portion 33 formed integrally with the outer disk portion 32, and the inclined connecting portion 61 interposed between the outer disk portion 32 and the inner disk portion 33. However, as shown in FIG. 18, the annular cover 28 may alternatively be constructed by including a thin-walled disk portion 141 having the annular lower surface 23 and the cylindrical inner peripheral surface 22 defining the through hole 21, a thin-walled tubular portion 142 formed integrally with the disk portion 141 and having the inner peripheral surface 25 constituted by a truncated conical surface, the engaging projecting portion 27 projecting radially inwardly from the inner peripheral surface 25 of the tubular portion 142, and an annular connecting portion 145 interposed between the disk portion 141 and the tubular portion 142 and having a semispherical outer peripheral surface 143 and a semispherical inner peripheral surface 144 which are arc-shaped in cross section. Further, the annular metal plate 34 may be constructed by including the outer disk portion 32 having, in addition to the annular upper surface 31 and the annular lower surface 35, a semispherical outer peripheral surface 146 which is arc-shaped in cross section and which opposes the cross-sectionally arc-shaped semispherical inner peripheral surface 144 of the connecting portion 145 and is continuously connected to the annular upper surface 31, and by including the thick-walled inner disk portion 33 having, in addition to the annular upper surface 67 and the inner peripheral surface 70 defining the through hole 69, the annular lower surface 68 continuously connected to the annular lower surface 35 of the outer disk portion 32 and flush with the annular lower surface 35 of the outer disk portion 32, while having, instead of the inclined outer peripheral surface 64, a cylindrical outer peripheral surface 147 opposing the cylindrical inner peripheral surface 22.

In the thrust sliding bearing 1 shown in FIG. 18, the annular projecting portion 15 is integrally formed on the annular upper surface 82 of the hollow cylindrical portion 4 on the inner peripheral surface 3 side of the hollow cylindrical portion 4 so that its annular upper surface becomes located lower than the annular lower surface 68 with an annular gap with respect to the annular lower surface 68, the downwardly protruding portion 62 is formed integrally on the annular lower surface 35 of the outer disk portion 32 in such a manner as to be suspended downwardly from the outer peripheral side of the annular lower surface 35 of the outer disk portion 32 such that its outer peripheral surface extends in contact with the semispherical inner peripheral surface 144 of the connecting portion 145 along that semispherical inner peripheral surface 144, and the annular metal plate 34 is made capable of holding its relative radial position with respect to the annular cover 28 by the contact of the outer peripheral surface of the downwardly protruding portion 62 with the semispherical inner peripheral surface 144.

Any one of the thrust sliding bearing means among the thrust sliding bearing means 36 shown in FIGS. 1 to 13, the thrust sliding bearing means 36 shown in FIGS. 15 and 16, the thrust sliding bearing means 36 shown in FIG. 17, and the thrust sliding bearing means 36 having the above-described electrodeposited coating may be also applied to the thrust sliding bearing 1 shown in FIG. 18.

In addition, also with any one of the thrust sliding bearings 1 shown in FIGS. 15 and 16, FIG. 17, and FIG. 18, the annular upper surface 67 and the annular lower surface 68 of the inner disk portion 33, which are clamped by the annular surface 116 of the nut 115 and the annular stepped surface 114 between the large-diameter portion 111 and the small-diameter portion 112 of the piston rod 91, may be coated with a ductile soft metal such as zinc, copper, or tin.

The invention claimed is:

1. A thrust sliding bearing comprising:
a synthetic resin-made bearing body having a hollow cylindrical portion with a cylindrical inner peripheral surface defining a through hole, an annular collar portion integrally extending radially outwardly from a cylindrical outer peripheral surface of the hollow cylindrical portion, an annular protruding portion integrally protruding radially outwardly from a lower side of a cylindrical outer peripheral surface of the annular collar portion, a tubular projecting portion formed on an annular upper surface of the annular protruding portion, said tubular projecting portion having a cylindrical inner peripheral surface, an annular outer recessed portion being defined by the cylindrical inner peripheral surface of said tubular projecting portion, the cylindrical outer peripheral surface of the annular collar portion and the annular upper surface of the annular protruding portion, and an annular engaging projecting portion projecting radially outwardly from a cylindrical outer peripheral surface of the tubular projecting portion;
an annular cover having a disk portion with an inner peripheral surface defining a through hole concentric with the through hole of said bearing body as well as an annular upper surface and an annular lower surface, a tubular portion formed integrally with the disk portion and having an inner peripheral surface, and an engaging projecting portion projecting radially inwardly from the inner peripheral surface of the tubular portion and adapted to engage the engaging projecting portion of said bearing body;
an annular metal plate having a radially outwardly disposed outer disk portion having an annular upper surface coming into contact with the annular lower surface of the disk portion of said annular cover and a radially inwardly disposed inner disk portion formed integrally with the outer disk portion and disposed in the through hole defined by the inner peripheral surface of the disk portion of said annular cover; and
a thrust sliding bearing mechanism between said bearing body and an annular lower surface of the outer disk portion of said annular metal plate and renders said annular metal plate rotatable with respect to said bearing body in a direction about an axis of said bearing body,
wherein the inner disk portion has a cylindrical inner peripheral surface having a smaller diameter than a diameter of the inner peripheral surface of the hollow cylindrical portion of said bearing body and defining a through hole concentric with the both through holes, and said thrust sliding bearing mechanism has an annular upper surface of said bearing body, a first annular groove formed on an inner peripheral side of the annular upper surface, a second annular groove surrounding the first annular groove and being shallower in depth than the first annular groove, and a lubricant which is filled in the first annular groove and the second annular groove.

2. The thrust sliding bearing according to claim 1, wherein said thrust sliding bearing mechanism has a plurality of second annular grooves which are mutually identical in depth.

3. The thrust sliding bearing according to claim 1, wherein the second annular groove has a wider radial width than a radial width of the first annular groove.

4. The thrust sliding bearing according to claim 1, wherein said thrust sliding bearing mechanism at the annular upper surface of said bearing body is in contact with the annular lower surface of the outer disk portion of said annular metal plate rotatably in the direction about the axis of said bearing body.

5. The thrust sliding bearing according to claim 1, wherein said thrust sliding bearing mechanism has a synthetic resin-made annular sheet disposed on the annular upper surface in such a manner as to cover the lubricant which is filled in the second annular groove and the first annular groove.

6. The thrust sliding bearing according to claim 5, wherein said thrust sliding bearing mechanism at the annular upper surface of the annular sheet is in contact with the annular lower surface of the outer disk portion of said annular metal plate rotatably in the direction about the axis of said bearing body.

7. The thrust sliding bearing according to claim 1, wherein said thrust sliding bearing mechanism has an electrodeposited coating which is provided on the annular lower surface of the outer disk portion of said annular metal plate.

8. The thrust sliding bearing according to claim 1, wherein at least the inner disk portion of said annular metal plate has at least one of an annular upper surface and an annular lower surface which are each coated with a ductile soft metal such as zinc, copper, or tin.

9. The thrust sliding bearing according to claim 1, wherein said annular cover has a connecting portion which is interposed between the disk portion and the tubular portion, said connecting portion having a cylindrical inner peripheral surface, an annular lower surface continuously connected to the cylindrical inner peripheral surface, and a semispherical outer peripheral surface which is arc-shaped in cross section, and the outer disk portion of said annular metal plate has a cylindrical outer peripheral surface opposing the cylindrical inner peripheral surface of the connecting portion in a radial direction.

10. The thrust sliding bearing according to claim 1, wherein said annular metal plate has an inclined connecting portion interposed between the outer disk portion and the inner disk portion and continuously connected to the inner disk portion in such a manner as to extend diagonally upwardly from an inner peripheral side of the outer disk portion and an annular downwardly protruding portion formed integrally with the outer disk portion and suspended downwardly from an outer peripheral side of the annular lower surface of the outer disk portion in such a manner as to envelop an upper edge portion of the outer peripheral surface of the annular collar portion.

11. The thrust sliding bearing according to claim 1, wherein said annular cover has a connecting portion interposed between the disk portion and the tubular portion, said connecting portion having a semispherical outer peripheral surface and a semispherical inner peripheral surface which are arc-shaped in cross section, and the outer disk portion of said annular metal plate has a semispherical outer peripheral surface which opposes the cross-sectionally arc-shaped semispherical inner peripheral surface of the connecting portion of said annular cover, while the inner disk portion of said annular metal plate has an annular lower surface continuously connected to the annular lower surface of the outer disk portion and flush with the annular lower surface of the outer disk portion.

12. A combination mechanism of a thrust sliding bearing and a piston rod, comprising: the thrust sliding bearing according to claim 1; and a piston rod of a shock absorber, wherein said piston rod includes a large-diameter portion disposed in a through hole of the hollow cylindrical portion of said bearing body, a small-diameter portion whose diameter is smaller than the large-diameter portion and which is formed integrally with the large-diameter portion and is disposed in a through hole defined by the cylindrical inner peripheral surface of the inner disk portion of said annular metal plate, and a threaded portion formed on the small-diameter portion, and wherein said annular metal plate at the inner disk portion is clamped by an annular stepped surface between the large-diameter portion and the small-diameter portion of said piston rod and an annular surface of a nut threadedly engaged with the threaded portion.

13. The combination mechanism of a thrust sliding bearing and a piston rod according to claim 12, wherein, in at least the inner disk portion of said annular metal plate, at least one of the annular upper surface and the annular lower surface which are clamped by the annular surface of the nut and the annular stepped surface between the large-diameter portion and the small-diameter portion of said piston rod is coated with a ductile soft metal such as zinc, copper, or tin.

14. The combination mechanism of a thrust sliding bearing and a piston rod according to claim 12 for use in a strut-type suspension in a four-wheeled vehicle.

* * * * *